(12) United States Patent
Liu et al.

(10) Patent No.: US 9,894,260 B2
(45) Date of Patent: Feb. 13, 2018

(54) METHOD AND DEVICE FOR CONTROLLING INTELLIGENT EQUIPMENT

(71) Applicant: Xiaomi Inc., Beijing (CN)

(72) Inventors: Huayijun Liu, Beijing (CN); Ke Wu, Beijing (CN); Pengfei Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/219,791

(22) Filed: Jul. 26, 2016

(65) Prior Publication Data

US 2017/0142317 A1 May 18, 2017

(30) Foreign Application Priority Data

Nov. 17, 2015 (CN) .......................... 2015 1 0792231

(51) Int. Cl.
*H04N 5/232* (2006.01)
*H04N 1/00* (2006.01)
(Continued)

(52) U.S. Cl.
CPC ....... *H04N 5/23203* (2013.01); *A47C 21/003* (2013.01); *A47C 31/008* (2013.01);
(Continued)

(58) Field of Classification Search
CPC ........... H04N 1/00381; H04N 5/23203; H04N 5/23219; G06T 7/70; G06T 7/74; A47C 21/003; A47C 31/008
See application file for complete search history.

(56) References Cited

U.S. PATENT DOCUMENTS 9,600,080 B2 * 3/2017 Poupyrev ................ G01S 13/04
2004/0073931 A1 * 4/2004 Trussell, Jr. ......... A47C 31/123
725/74
(Continued)

FOREIGN PATENT DOCUMENTS

CN 1423228 A 6/2003
CN 102523401 A 6/2012
(Continued)

OTHER PUBLICATIONS

International Search Report in international Application No. PCT/CN2015/099021, dated Aug. 22, 2016.
(Continued)

*Primary Examiner* — Daniel M Pasiewicz
(74) *Attorney, Agent, or Firm* — Finnegan, Henderson, Farabow, Garrett & Dunner LLP

(57) ABSTRACT

A method for controlling intelligent equipment includes receiving an image acquisition request sent from an intelligent mattress. The image acquisition request contains an identifier (ID) of the intelligent mattress and is triggered when a user uses the intelligent mattress. The method further includes sending the image acquisition request to an intelligent photographing device associated with the intelligent mattress based on the ID of the intelligent mattress, receiving eyeball information of the user and device identification information, determining a target intelligent device based on the device identification information, and controlling the target intelligent device based on the eyeball information.

16 Claims, 15 Drawing Sheets

(51) Int. Cl.
  *H04N 7/18*      (2006.01)
  *G06K 9/00*      (2006.01)
  *A47C 21/00*     (2006.01)
  *A47C 31/00*     (2006.01)
  *G06T 7/00*      (2017.01)
  *G06T 7/70*      (2017.01)
  *G06T 7/73*      (2017.01)

(52) U.S. Cl.
  CPC .......... *G06K 9/00597* (2013.01); *G06T 7/004* (2013.01); *G06T 7/70* (2017.01); *G06T 7/74* (2017.01); *H04N 1/00381* (2013.01); *H04N 5/23219* (2013.01); *H04N 7/188* (2013.01); *G06T 2207/30201* (2013.01)

(56) References Cited

U.S. PATENT DOCUMENTS

| | | | |
|---|---|---|---|
| 2010/0324779 A1 | 12/2010 | Takahashi et al. | |
| 2012/0296156 A1* | 11/2012 | Auphan | A61M 21/02 600/28 |
| 2012/0300061 A1 | 11/2012 | Osman et al. | |
| 2013/0245389 A1* | 9/2013 | Schultz | A61B 5/0002 600/301 |
| 2013/0289432 A1* | 10/2013 | Van Vugt | A61B 5/0077 600/534 |
| 2015/0081335 A1* | 3/2015 | Dixon | G06F 19/327 705/3 |
| 2015/0164238 A1* | 6/2015 | Benson | A47C 31/00 340/540 |
| 2015/0281659 A1* | 10/2015 | Hood | A61G 7/018 348/143 |
| 2016/0162039 A1 | 6/2016 | Eilat et al. | |
| 2017/0020391 A1* | 1/2017 | Flitsch | A61B 5/6898 |
| 2017/0020440 A1* | 1/2017 | Flitsch | A61B 5/6898 |
| 2017/0020441 A1* | 1/2017 | Flitsch | A61B 5/6898 |
| 2017/0049360 A1* | 2/2017 | Wu | A47C 31/00 |
| 2017/0100076 A1* | 4/2017 | Benson | A61B 5/6892 |

FOREIGN PATENT DOCUMENTS

| | | |
|---|---|---|
| CN | 102981625 A | 3/2013 |
| CN | 102508551 B | 6/2014 |
| CN | 103873959 A | 6/2014 |
| CN | 104145232 A | 11/2014 |
| CN | 104606003 A | 5/2015 |
| CN | 104977904 A | 10/2015 |
| CN | 105045240 A | 11/2015 |
| WO | WO 2012/162060 A2 | 11/2012 |
| WO | WO 2015/011703 A1 | 1/2015 |

OTHER PUBLICATIONS

Extended Search Report for European Application No. 16190832.2 from the European Patent Office, dated Mar. 28, 2017.

Lee, H.C., et al., *Gaze Tracking System at a Distance for Controlling IPTV*, IEEE Transactions on Consumer Electronics, vol. 56, No. 4, pp. 2577-2583, Nov. 1, 2010.

Jaimes, A., et al., *Multimodal human-computer interaction: A survey*, Computer Vision and Image Understanding, vol. 108, pp. 116-134, Sep. 1, 2007.

Shi, F., et al., *Helping People with ICT Device Control by Eye Gaze*, ICCHP, 2006, LNCS 4061, pp. 480-487, Jan. 1, 2006.

Shell, J., et al., *Interacting with Groups of Computers*, Communications of the ACM, vol. 46, No. 3, pp. 40-46, Mar. 2003.

English version of International Search Report of PCT/CN2015/099021, dated Aug. 22, 2016, issued by the ISA/CN—State Intellectual Property Office of the P.R. China.

First Office Action in counterpart Chinese Application No. 201510792231.5, dated Dec. 4, 2017 and English translation thereof.

\* cited by examiner

METHOD AND DEVICE FOR CONTROLLING INTELLIGENT EQUIPMENT

CROSS-REFERENCE TO RELATED APPLICATIONS

This application is filed based upon and claims priority to Chinese Patent Application 201510792231.5, filed on Nov. 17, 2015, the entire contents of which are incorporated herein by reference.

TECHNICAL FIELD

The present disclosure generally relate to intelligent homes and, more particularly, to a method and device for controlling intelligent equipment.

BACKGROUND

In conventional technologies, a user usually controls an intelligent device through a remote controller of the intelligent device. For example, the user can use a remote controller to control an intelligent air conditioner, such as to turn on, turn off, increase temperature, or decrease temperature.

SUMMARY

In accordance with the present disclosure, there is provided a method for controlling intelligent equipment including receiving an image acquisition request sent from an intelligent mattress. The image acquisition request contains an identifier (ID) of the intelligent mattress and is triggered when a user uses the intelligent mattress. The method further includes sending the image acquisition request to an intelligent photographing device associated with the intelligent mattress based on the ID of the intelligent mattress, receiving eyeball information of the user and device identification information, determining a target intelligent device based on the device identification information, and controlling the target intelligent device based on the eyeball information.

Also in accordance with the present disclosure, there is provided a method for controlling intelligent equipment including receiving an image acquisition request sent from an intelligent mattress. The image acquisition request contains an identifier (ID) of the intelligent mattress and is triggered when a user uses the intelligent mattress. The method further includes sending the image acquisition request to an intelligent photographing device associated with the intelligent mattress based on the ID of the intelligent mattress, and receiving a mattress position image and eyeball information of the user. The mattress position image is obtained by the intelligent photographing device by performing image acquisition on a position where the intelligent mattress is located. The method also includes determining a target intelligent device based on the mattress position image, and controlling the target intelligent device based on the eyeball information.

Also in accordance with the present disclosure, there is provided a device for controlling intelligent equipment including a processor and a memory storing instructions that, when executed by the processor, cause the processor to receive an image acquisition request sent from an intelligent mattress. The image acquisition request contains an identifier (ID) of the intelligent mattress and is triggered when a user uses the intelligent mattress. The instructions further cause the processor to send the image acquisition request to an intelligent photographing device associated with the intelligent mattress based on the ID of the intelligent mattress, receive eyeball information of the user and device identification information, determine a target intelligent device based on the device identification information, and control the target intelligent device based on the eyeball information.

Also in accordance with the present disclosure, there is provided a device for controlling intelligent equipment including a processor and a memory storing instructions that, when executed by the processor, cause the processor to receive an image acquisition request sent from an intelligent mattress. The image acquisition request contains an identifier (ID) of the intelligent mattress and is triggered when a user uses the intelligent mattress. The instructions further cause the processor to send the image acquisition request to an intelligent photographing device associated with the intelligent mattress based on the ID of the intelligent mattress, and receive a mattress position image and eyeball information of the user. The mattress position image is obtained by the intelligent photographing device by performing image acquisition on a position where the intelligent mattress is located. The instructions also cause the processor to determine a target intelligent device based on the mattress position image, and control the target intelligent device based on the eyeball information.

It is to be understood that the above general description and detailed description below are only exemplary and explanatory and not intended to limit the present disclosure.

BRIEF DESCRIPTION OF THE DRAWINGS

The accompanying drawings, which are incorporated in the specification and constitute a part of this specification, illustrate embodiments consistent with the present disclosure and, together with the specification, serve to explain the principles of the invention.

DETAILED DESCRIPTION

Exemplary embodiments will be described in details herein and examples of the exemplary embodiments are illustrated in the accompanying drawings. Unless specified otherwise, the same numbers in different accompanying drawings represent the same or similar elements when the accompanying drawings are described hereinafter. The implementation modes described in the following exemplary embodiments do not represent all the implementation modes consistent with the present disclosure. In contrast, they are only examples of devices and methods as recited in the appended claims and consistent with some aspects of the present disclosure.

Figure 1:
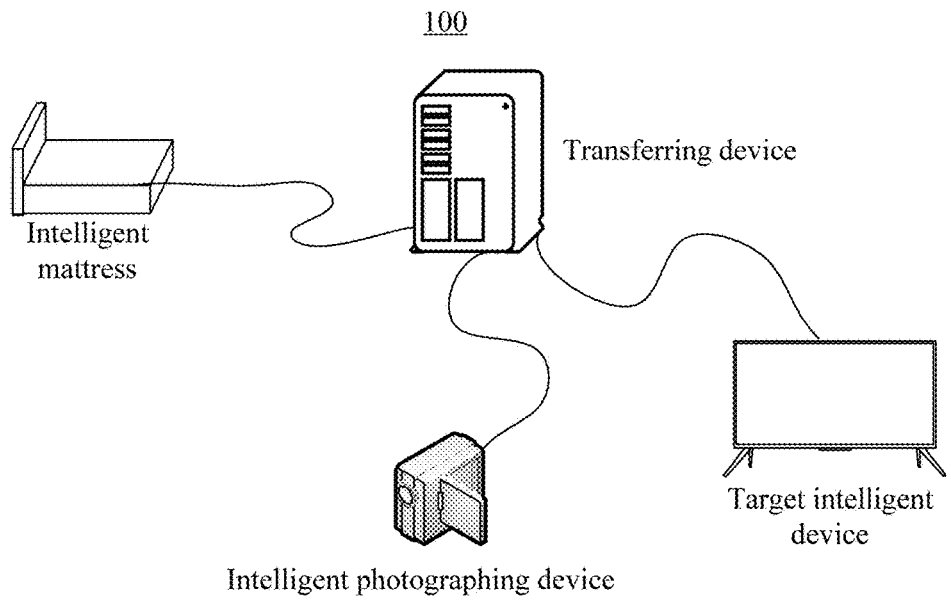
FIG. 1 is a structure diagram of a system for controlling intelligent equipment according to an exemplary embodiment.

FIG. 1 is a structure diagram of a system 100 for controlling intelligent equipment according to an exemplary embodiment. As shown in FIG. 1, the system 100 includes an intelligent mattress, a transferring device, an intelligent photographing device, and a target intelligent device. The intelligent mattress, the intelligent photographing device, and the target intelligent device are respectively coupled to the transferring device by, for example, a wireless connection, such as a WiFi connection or a BlueTooth connection. Message interactions among the intelligent mattress, the intelligent photographing device, and the target intelligent device can be implemented through the transferring device. The intelligent mattress can trigger a message interaction among the intelligent mattress, the intelligent photographing device, and the target intelligent device. The intelligent photographing device can acquire eyeball information and device identification information. The transferring device can control the target intelligent device based on the eyeball information.

In FIG. 1, only one target intelligent device is shown. Such an intelligent device to be controlled according to the present disclosure is also referred to herein as a controlled intelligent device. The system 100, however, can include more than one controlled intelligent device, and can select to control one of the more than one controlled intelligent device according to some of the embodiments described below.

Figure 2:
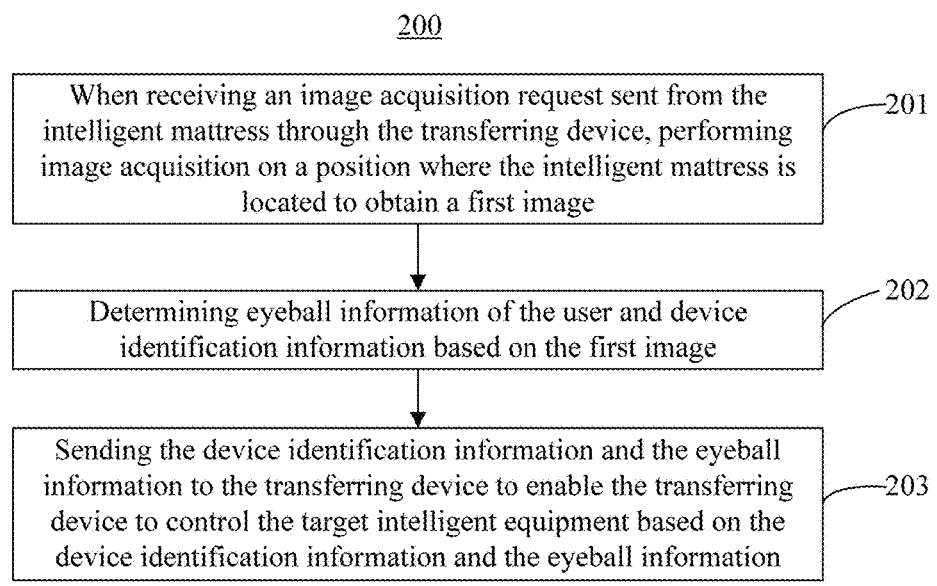
FIG. 2 is a flow chart showing a method for controlling intelligent equipment according to an exemplary embodiment.

FIG. 2 is a flow chart showing a method 200 for controlling intelligent equipment according to an exemplary embodiment. The method 200 can be implemented, for example, in the intelligent photographing device in the system 100. As shown in FIG. 2, at 201, when an image acquisition request sent from the intelligent mattress through the transferring device is received, image acquisition is performed on a position where the intelligent mattress is located, also referred to herein as an "intelligent mattress position," to obtain a first image. The image acquisition request is triggered when a user uses the intelligent mattress. The first image is also referred to herein as a "mattress position image." At 202, eyeball information of the user and device identification information are determined based on the first image. The device identification information is configured to determine the target intelligent device to be controlled. At 203, the device identification information and the eyeball information are sent to the transferring device to enable the transferring device to control the target intelligent device based on the device identification information and the eyeball information.

In some embodiments, to determine the device identification information based on the first image, the intelligent photographing device determines a sight direction of the user according to the first image and determines the device identification information based on the sight direction.

In some embodiments, to determine the sight direction of the user according to the first image, the intelligent photographing device performs face recognition on the first image to obtain a position where an eye of the user is located, also referred to herein as an "eye position," and performs sight recognition on the eye of the user to obtain the sight direction of the user based on the eye position.

In some embodiments, to perform sight recognition on the eye of the user to obtain the sight direction of the user based on the eye position, the intelligent photographing device determines an angle of an eye pupil of the user relative to a normal sight direction, also referred to herein as an "eye pupil offset angle," based on the eye position and determines the sight direction of the user based on the eye pupil offset angle.

In some embodiments, to determine the device identification information based on the sight direction, the intelligent photographing device performs image acquisition on a position to which the sight direction points, also referred to as a "sight position," to obtain a second image, and determines the second image as the device identification information. The second image is also referred to herein as a "sight position image." Alternatively, the intelligent photographing device determines a first angle between the sight direction and a horizontal direction, determines a second angle between the sight direction and a specified direction, and determines the first angle and the second angle as the device identification information. The first angle is also referred to herein as a "sight-horizontal angle" and the second angle is also referred to herein as a "sight-specified angle."

The exemplary embodiments described above can be combined as needed, and the description of the combinations thereof is omitted here.

Figure 3:
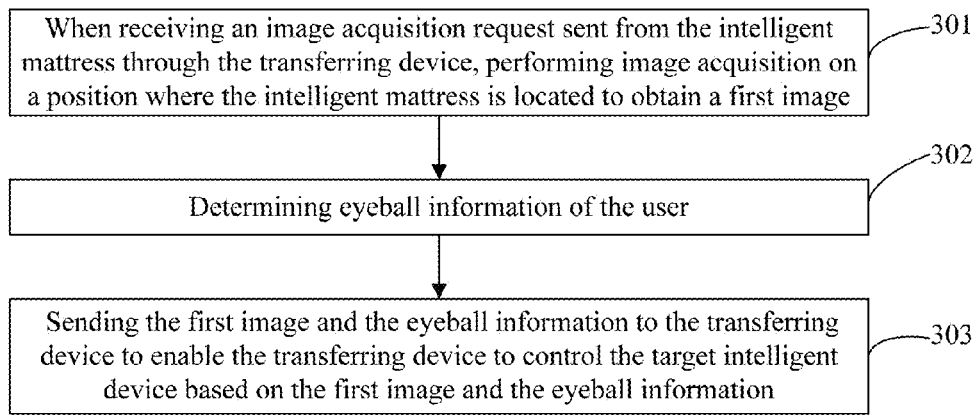
FIG. 3 is a flow chart showing a method for controlling intelligent equipment according to another exemplary embodiment.

FIG. 3 is a flow chart showing a method 300 for controlling intelligent equipment according to another exemplary embodiment. The method 300 can be implemented in the intelligent photographing device in the system 100. As shown in FIG. 3, at 301, when an image acquisition request sent from the intelligent mattress through the transferring device is received, image acquisition is performed on an intelligent mattress position to obtain a first image. The image acquisition request is triggered when a user uses the intelligent mattress. At 302, eyeball information of the user is determined. At 303, the first image and the eyeball information are sent to the transferring device to enable the transferring device to control the target intelligent device based on the first image and the eyeball information.

In some embodiments, after sending the first image and the eyeball information to the transferring device, the intelligent photographing device receives a sight direction sent by the transferring device and performs image acquisition on a sight position to obtain a second image. The sight direction is obtained by the transferring device analyzing the first image. The intelligent photographing device then sends the second image to the transferring device.

The exemplary embodiments described above can be combined as needed, and the description of the combinations thereof is omitted here.

Figure 4:
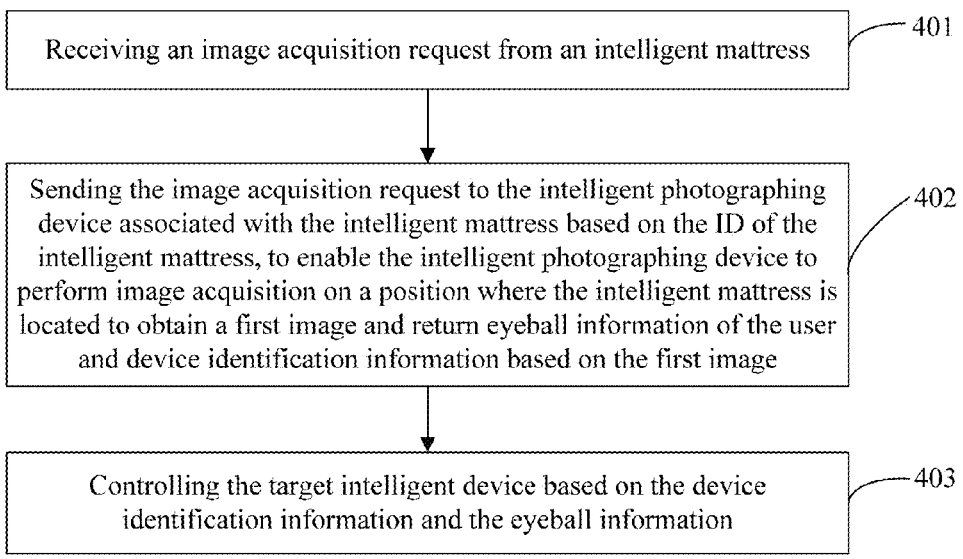
FIG. 4 is a flow chart showing a method for controlling intelligent equipment according to another exemplary embodiment.

FIG. 4 is a flow chart showing a method 400 for controlling intelligent equipment according to another exemplary embodiment. The method 400 can be implemented, for example, in the transferring device. As shown in FIG. 4, at 401, an image acquisition request is received from an intelligent mattress. The image acquisition request contains an ID of the intelligent mattress and is triggered when a user uses the intelligent mattress. At 402, the image acquisition request is sent to the intelligent photographing device associated with the intelligent mattress based on the ID of the intelligent mattress, to enable the intelligent photographing device to perform image acquisition on an intelligent mattress position to obtain a first image and return eyeball information of the user and device identification information based on the first image. The device identification information is configured to determine the target intelligent device to be controlled. At 403, the target intelligent device is controlled based on the device identification information and the eyeball information.

In some embodiments, to control the target intelligent device based on the device identification information and the eyeball information, the transferring device determines the target intelligent device based on the device identification information and controls the target intelligent device based on the eyeball information.

In some embodiments, the device identification information includes a second image obtained by the intelligent photographing device by performing image acquisition on a sight position. In this scenario, to determine the target intelligent device based on the device identification information, the transferring device searches a stored image library to select a target image matching the second image and determines an intelligent device in the target image as the target intelligent device.

Alternatively, the transferring device recognizes from the second image a device mark of the intelligent device in the second image, acquires a corresponding intelligent device ID from a stored corresponding relationship between device marks and intelligent device IDs based on the device mark, and determines an intelligent device corresponding to the acquired intelligent device ID as the target intelligent device.

In some embodiments, the device identification information is a first angle between the sight direction of the user and a horizontal direction and a second angle between the sight direction and a specified direction. In this scenario, to determine the target intelligent device based on the device identification information, the transferring device acquires a corresponding intelligent device ID from a stored corresponding relationship among first angles, second angles, and intelligent device IDs based on the first angle and the second angle and determines an intelligent device corresponding to the acquired intelligent device ID as the target intelligent device.

In some embodiments, to control the target intelligent device based on the received eyeball information, the transferring device acquires a corresponding control operation from a stored corresponding relationship between eyeball information and control operations according to the received eyeball information, and controls the target intelligent device based on the acquired control operation.

The exemplary embodiments described above can be combined as needed, and the description of the combinations thereof is omitted here.

Figure 5:
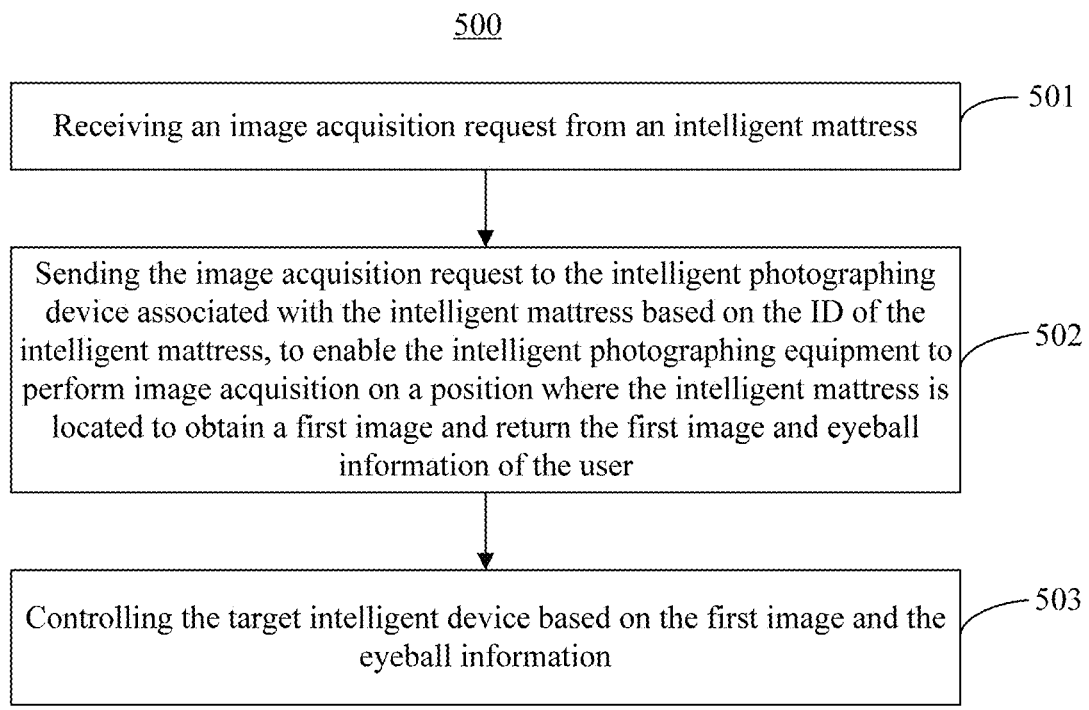
FIG. 5 is a flow chart showing a method for controlling intelligent equipment according to another exemplary embodiment.

FIG. 5 is a flow chart showing a method 500 for controlling intelligent equipment according to another exemplary embodiment. The method 500 can be implemented, for example, in the transferring device in the system 100. As shown in FIG. 5, at 501, an image acquisition request is received from the intelligent mattress. The image acquisition request contains an ID of the intelligent mattress and is triggered when a user uses the intelligent mattress. At 502, the image acquisition request is sent to the intelligent photographing device associated with the intelligent mattress based on the ID of the intelligent mattress, to enable the intelligent photographing device to perform image acquisition on an intelligent mattress position to obtain a first image and return the first image and eyeball information of the user. At 503, the target intelligent device is controlled based on the first image and the eyeball information.

In some embodiments, to control the target intelligent device based on the first image and the eyeball information, the transferring device determines a sight direction of the user according to the first image, determines the target intelligent device based on the sight direction, and controls the target intelligent device based on the eyeball information.

In some embodiments, to determine the sight direction of the user according to the first image, the transferring device performs face recognition on the first image to obtain an eye position of the user and performs sight recognition on the eye of the user to obtain the sight direction of the user based on the eye position.

In some embodiments, to perform sight recognition on the eye of the user to obtain the sight direction of the user based on the eye position, the transferring device determines an eye pupil offset angle based on the eye position and determines the sight direction of the user based on the eye pupil offset angle.

In some embodiments, to determine the target intelligent device based on the sight direction, the transferring device determines a first angle between the sight direction and a horizontal direction and a second angle between the sight direction and a specified direction, acquires a corresponding intelligent device ID from a stored corresponding relationship among first angles, second angles, and intelligent device IDs based on the first angle and the second angle, and determines an intelligent device corresponding to the acquired intelligent device ID as the target intelligent device.

In some embodiments, to determine the target intelligent device based on the sight direction, the transferring device sends the sight direction to the intelligent photographing device. The intelligent photographing device performs image acquisition on a sight position to obtain a second image and returns the second image. When receiving the second image returned by the intelligent photographing device, the transferring device determines the target intelligent device based on the second image.

In some embodiments, to determine the target intelligent device based on the second image, the transferring device selects a target image matching the second image from a stored image library and determines an intelligent device in the target image as the target intelligent device.

In some embodiments, to determine the target intelligent device based on the second image, the transferring device recognizes from the second image a device mark of an intelligent device in the second image, acquires a corresponding intelligent device ID from a stored corresponding relationship between device marks and intelligent device IDs based on the device mark, and determines an intelligent device corresponding to the acquired intelligent device ID as the target intelligent device.

In some embodiments, to control the target intelligent device based on the eyeball information, the transferring device acquires a corresponding control operation from a stored corresponding relationship between eyeball information and control operations based on the eyeball information and controls the target intelligent device based on the acquired control operation.

The exemplary embodiments described above can be combined as needed, and the description of the combinations thereof is omitted here.

Figure 6:
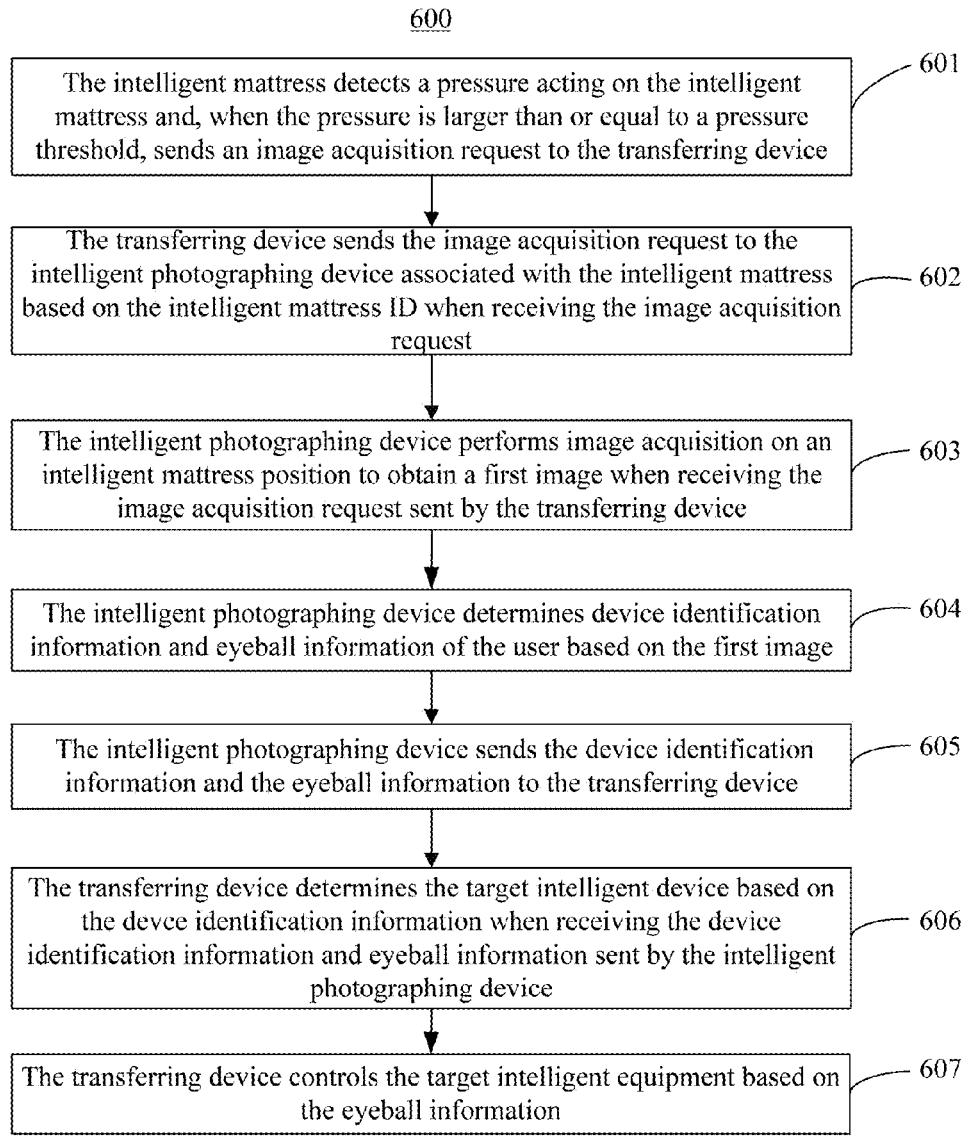
FIG. 6 is a flow chart of a method for controlling intelligent equipment according to another exemplary embodiment.

FIG. 6 is a flow chart showing a method 600 for controlling intelligent equipment according to another exemplary embodiment. The method 600 can be implemented, for example, in the system 100. As shown in FIG. 6, at 601, the intelligent mattress detects a pressure acting on the intelligent mattress and, when the pressure is larger than or equal to a pressure threshold, sends an image acquisition request to the transferring device. The image acquisition request contains an ID of the intelligent mattress.

In some embodiments, a pressure detection device can be arranged in the intelligent mattress. The intelligent mattress can detect the pressure through the pressure detection device. The pressure detection device, for example, can be a pressure sensor or the like. The pressure detected through the pressure sensor can be, for example, 30 kilograms, 50 kilograms, or the like.

When a user uses the intelligent mattress, a higher pressure on the intelligent mattress is generated. Therefore, the intelligent mattress can judge whether the user is using the intelligent mattress according to the detected pressure. When the detected pressure is larger than or equal to the pressure threshold, it is determined that the user is using the intelligent mattress and that the user may be lying on the intelligent mattress. In addition, when the user lies on the intelligent mattress, the user may need to turn on an intelligent television, reduce temperature of an intelligent air conditioner, etc. Therefore, the intelligent mattress can send the image acquisition request to the transferring device.

In some embodiments, the pressure threshold can be set in advance. The pressure threshold can, for example, be 30 kilograms, 40 kilograms, 50 kilograms, or the like. For example, assume the pressure threshold is 30 kilograms. When the pressure detected by the intelligent mattress through the pressure detection device is 50 kilograms, which is larger than the pressure threshold, it can be determined that the user is using the intelligent mattress. Therefore, the intelligent mattress sends the image acquisition request to the transferring device.

In some embodiments, an ID is used for uniquely identifying the intelligent mattress. Such an ID is also referred to herein as an "intelligent mattress ID," which can be, for example, a Media Access Control (MAC) address, a factory serial number, or the like, of the intelligent mattress.

According to the present disclosure, the transferring device is configured to implement communication among the intelligent mattress, the intelligent photographing device, and the target intelligent device. The transferring device, the intelligent mattress, the intelligent photographing device, and the target intelligent device can be connected in the same local area network. The transferring device can be, for example, a home router, a home server, or the like.

Moreover, a wireless communication chip, such as a WiFi chip or a BlueTooth chip can be arranged in each of the intelligent mattress, the intelligent photographing device, and the target intelligent device, so that the intelligent mattress, the intelligent photographing device, and the target intelligent device can respectively communicate with a server through their own built-in wireless communication chips. That is, message transmission between the transferring device and each of the intelligent mattress, the intelligent photographing device, and the target intelligent device can be performed through a wireless connection, such as a WiFi or a BlueTooth connection.

At 602, the transferring device sends the image acquisition request to the intelligent photographing device associated with the intelligent mattress based on the intelligent mattress ID when receiving the image acquisition request.

In some embodiments, when receiving the image acquisition request from the intelligent mattress, the transferring device acquires a corresponding intelligent photographing device ID from a stored corresponding relationship between intelligent mattress IDs and intelligent photographing device IDs based on the intelligent mattress ID in the image acquisition request, determines an intelligent photographing device corresponding to the acquired intelligent photographing device ID as the intelligent photographing device associated with the intelligent mattress, and sends the image acquisition request to the determined intelligent photographing device.

In some embodiments, the corresponding relationship between intelligent mattress IDs and intelligent photographing device IDs can be pre-stored in the transferring device. That is, the transferring device can receive a device binding request containing at least one intelligent mattress ID and at least one intelligent photographing device ID, and store the at least one intelligent mattress ID and the at least one intelligent photographing device ID in the corresponding relationship between intelligent mattress IDs and intelligent photographing device IDs. The device binding request can be sent, for example, by the intelligent mattress, the intelligent photographing device, or an intelligent terminal. In addition, one intelligent mattress can be associated with one intelligent photographing device or be simultaneously associated with a plurality of intelligent photographing devices.

In some embodiments, an intelligent photographing device ID is configured to uniquely identify an intelligent photographing device, and can be, for example, a MAC address, a factory serial number, or the like, of the intelligent photographing device.

Table 1 lists an exemplary corresponding relationship between intelligent mattress IDs and intelligent photographing device IDs. In this example, the intelligent mattress IDs are the factory serial numbers of the intelligent mattresses and the intelligent photographing device IDs are the factory serial numbers of the intelligent photographing devices. For example, assume the intelligent mattress ID in the image acquisition request is 0001. Based on the received intelligent mattress ID 0001, the transferring device acquires the corresponding intelligent photographing device IDs 000A and 000B from the corresponding relationship shown in Table 1, and sends the image acquisition request to the intelligent photographing devices with the intelligent photographing device IDs 000A and 000B.

TABLE 1

| Intelligent mattress ID | Intelligent photographing device ID |
|---|---|
| 0001 | 000A, 000B |
| 0002 | 000C |
| 0003 | 000D, 000E |
| . . . | . . . |

At 603, the intelligent photographing device performs image acquisition on an intelligent mattress position to obtain a first image when receiving the image acquisition request sent by the transferring device.

When the user uses the intelligent mattress, the user may lie on the intelligent mattress at different positions and/or with different postures. To obtain eyeball information, the first image needs to include a front image of the face of the user. In some embodiments, one intelligent photographing device is used to acquire the front image of the face of the user. In some embodiments, a plurality of intelligent photographing devices associated with the intelligent mattress can be arranged around the intelligent mattress and simultaneously perform image acquisition to ensure acquisition of the front image of the face of the user. This improves the reliability in acquiring the front image of the face of the user.

The intelligent photographing device associated with the intelligent mattress can be arranged at any position around the intelligent mattress, such as by the side or the end of the intelligent mattress.

At 604, the intelligent photographing device determines the eyeball information of the user and device identification information based on the first image. The device identification information is for determining the target intelligent device to be controlled.

In some embodiments, to determine the device identification information based on the first image, the intelligent photographing device determines a sight direction of the user according to the first image and determines the device identification information based on the sight direction.

In some embodiments, to determine the sight direction of the user according to the first image, the intelligent photographing device performs face recognition on the first image to obtain an eye position of the user and performs sight recognition on the eye of the user to obtain the sight direction of the user based on the eye position of the user.

In some embodiments, to perform face recognition on the first image to obtain the eye position of the user, the intelligent photographing device performs body recognition on the first image and performs face recognition on a recognized body.

In some embodiments, to perform sight recognition on the eye of the user to obtain the sight direction of the user based on the eye position of the user, the intelligent photographing device determines an eye pupil offset angle based on the eye position of the user and determines the sight direction of the user based on the eye pupil offset angle.

Figure 7:
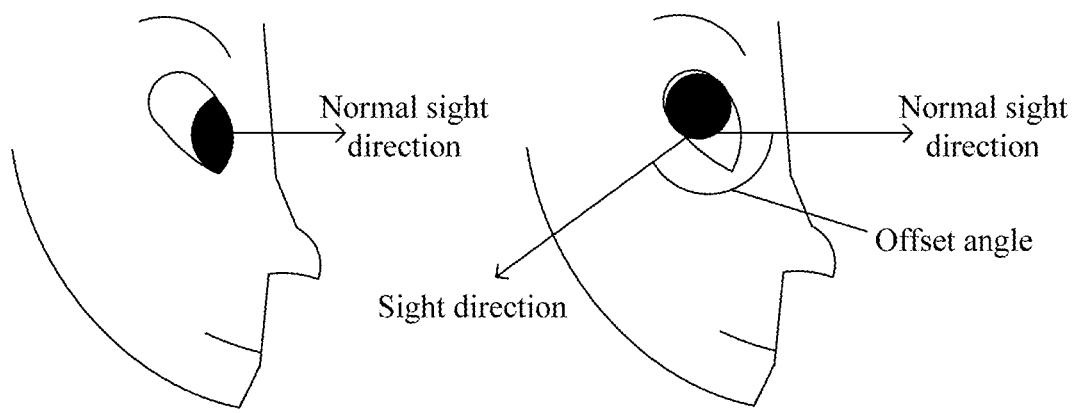
FIG. 7 is a schematic diagram illustrating an eye pupil offset angle according to an exemplary embodiment.

In some embodiments, to determine the eye pupil offset angle, the intelligent photographing device determines the normal sight direction of the eye pupil and a current position of the eye pupil in the eye based on the eye position of the user. For example, FIG. 7 shows examples of the normal sight direction of the eye pupil and the eye pupil offset angle. According to the present disclosure, the intelligent photographing device can determine the eye pupil offset angle of the left eye of the user, the eye pupil offset angle of the right eye of the user, or the eye pupil offset angles of both eyes of the user.

In the present disclosure, the normal sight direction refers to a sight direction of the user when the eye pupil of the user is located at a central position of the eye. That is, the normal sight direction is a front sight direction of the eye of the user.

In some embodiments, to determine the device identification information based on the sight direction, the intelligent photographing device performs image acquisition on a sight position to obtain a second image and determines the second image as the device identification information. Alternatively, the intelligent photographing device determines a first angle between the sight direction and a horizontal direction, determines a second angle between the sight direction and a specified direction, and determines the first angle and the second angle as the device identification information.

Figure 8:
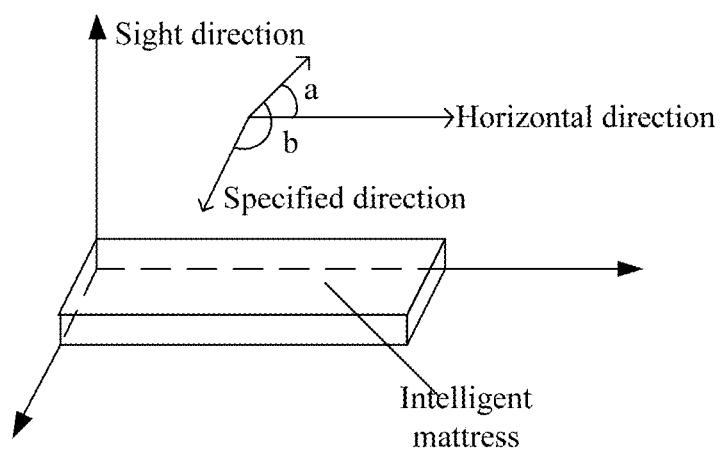
FIG. 8 is a schematic diagram illustrating a horizontal direction and a specified direction according to an exemplary embodiment.

In the present disclosure, the horizontal direction refers to a direction where the sight direction is perpendicularly mapped to a horizontal plane, and the specified direction refers to a preset direction, such as a direction parallel to the short side of the intelligent mattress. FIG. 8 shows examples of the horizontal direction and the specified direction. In FIG. 8, angle a is the first angle and angle b is the second angle.

In some embodiments, to determine the eyeball information of the user, the intelligent photographing device determines a time length during which the user looks at the target intelligent device, also referred to herein as a "sight time length," and determines the sight time length as the eyeball information of the user. The sight time length can be, for example, 3 seconds, 5 seconds, 10 seconds, or the like, and each sight time length corresponds to one control operation.

In some embodiments, the eyeball information can additionally or alternatively include other information, such as a moving direction or a rotating direction of the eye of the user. The moving direction can be a leftward moving direction, a rightward moving direction, or the like. The rotating direction can be a rightward rotating direction, a leftward rotating direction, or the like. Each direction can correspond to one control operation.

At 605, the intelligent photographing device sends the device identification information and the eyeball information to the transferring device. The transferring device can then control the target intelligent device based on the device identification information and the eyeball information.

At 606, the transferring device determines the target intelligent device based on the device identification information when receiving the device identification information and eyeball information from the intelligent photographing device.

In some embodiments, the device identification information includes a second image obtained by the intelligent photographing device by performing image acquisition on the sight position. In this scenario, the transferring device selects a target image matching the second image from a stored image library and determines an intelligent device in the target image as the target intelligent device.

In some embodiments, to select the target image matching the second image from the stored image library, the transferring device performs image recognition on the second image to obtain an image area where an intelligent device in the second image is located, selects an image from the stored image library that is the same as the obtained image area, and determines the image as a target image. Alternatively, the transferring device determines similarities between the second image and images in the stored image library, selects from the image library an image having a similarity higher than a similarity threshold based on the determined similarities, and determines the selected image as the target image. The similarity threshold can be preset and, for example, can be 95%, 90%, or the like.

In some embodiments, the transferring device recognizes a device mark of an intelligent device in the second image, acquires a corresponding intelligent device ID from a stored corresponding relationship between device marks and intelligent device IDs based on the device mark, and determines an intelligent device corresponding to the acquired intelligent device ID as the target intelligent device.

Table 2 shows an exemplary corresponding relationship between device marks and intelligent device IDs consistent with the present disclosure. For example, if the device mark recognized from the second image by the transferring device is mark 1, the transferring device acquires a corresponding intelligent device ID, i.e., ID1, based on mark 1, and determines the intelligent device corresponding to ID1 as the target intelligent device.

TABLE 2

| Device mark | Intelligent device ID |
|---|---|
| Mark 1 | ID1 |
| Mark 2 | ID2 |
| Mark 3 | ID3 |
| . . . | . . . |

In some embodiments, the device mark of the intelligent device in the second image can be recognized by an image recognition method or another recognition manner.

According to the present disclosure, a device mark uniquely marks a corresponding intelligent device and can be preset. For example, the device mark can be a two-dimensional code, a barcode, or another recognizable mark. An intelligent device ID uniquely identifies an intelligent device and can be preset. For example, the intelligent device ID can be a MAC, a factory serial number, or the like.

Moreover, the corresponding relationship between device marks and intelligent device IDs can be preset. That is, the transferring device can receive a mark setting request containing at least one device mark and at least one intelligent device ID, and store the at least one device mark and at least one intelligent device ID in the corresponding relationship between device marks and intelligent device IDs.

In some embodiments, the device identification information includes a first angle between the sight direction of the user and a horizontal direction and a second angle between the sight direction and the specified direction. In this scenario, the transferring device acquires a corresponding intelligent device ID from a stored corresponding relationship among first angles, second angles, and intelligent device IDs based on the first angle and the second angle, and determines an intelligent device corresponding to the acquired intelligent device ID as the target intelligent device.

Table 3 lists an exemplary corresponding relationship among first angles, second angles, and intelligent device IDs. For example, when the first angle is 10 degrees and the second angle is 30 degrees, the transferring device acquires a corresponding intelligent device ID, i.e., ID1, from the corresponding relationship among first angles, second angles, and intelligent device IDs based on the first angle of 10 degrees and the second angle of 30 degrees, and determines an intelligent device corresponding to is ID1 as the target intelligent device.

TABLE 3

| First angle | Second angle | Intelligent device ID |
|---|---|---|
| 10 degrees | 30 degrees | ID1 |
| 45 degrees | 90 degrees | ID2 |
| 10 degrees | 120 degrees | ID3 |
| . . . | . . . | . . . |

In the examples described above, the target intelligent device is determined by the transferring device based on the device identification information. In other embodiments, the target intelligent device can alternatively be determined by the intelligent photographing device.

At 607, the transferring device controls the target intelligent device based on the eyeball information. According to the present disclosure, different eyeball information can corresponds to different control operations. In some embodiments, the corresponding relationship between eyeball information and control operations can be preset. That is, the transferring device can receive an eyeball and control association request containing at least one piece of eyeball information and at least one control operation, and store the at least one piece of eyeball information and at least one control operation in the corresponding relationship between eyeball information and control operations. For example, if the eyeball information indicates that the user looks at an intelligent device for 3 seconds, the corresponding control operation can be turning off the intelligent device. If the eyeball information indicates that the user looks at an intelligent device for 5 seconds, the corresponding control operation can be turning on the intelligent device. For an intelligent air conditioner, if the eyeball information indicates that the user looks at the intelligent air conditioner for 10 seconds, the corresponding control operation can be reducing the temperature.

In some embodiments, the eyeball and control association request can be sent by the intelligent mattress, the intelligent photographing device, or an intelligent terminal.

In some embodiments, the control operation is only performing switching control on the target intelligent device. In this scenario, to perform switching control on the target intelligent device based on the eyeball information, the transferring device sends a turning-off message to the target intelligent device based on the eyeball information to turn off the target intelligent device if the target intelligent is currently turned on, and sends a turning-on message to the target intelligent device based on the eyeball information to turn on the target intelligent device if the target intelligent device is currently turned off.

In some embodiments, the transferring device can store a current state of the target intelligent device, and update the stored current state of the target intelligent device after switching the state of the target intelligent device.

For example, if the eyeball information indicates that the user looks at the target intelligent device for 3 seconds and the current state of the target intelligent device is a turned-on state, the transferring device sends a turning-off message to the target intelligent device based on the eyeball information to turn off the target intelligent device.

Figure 9:
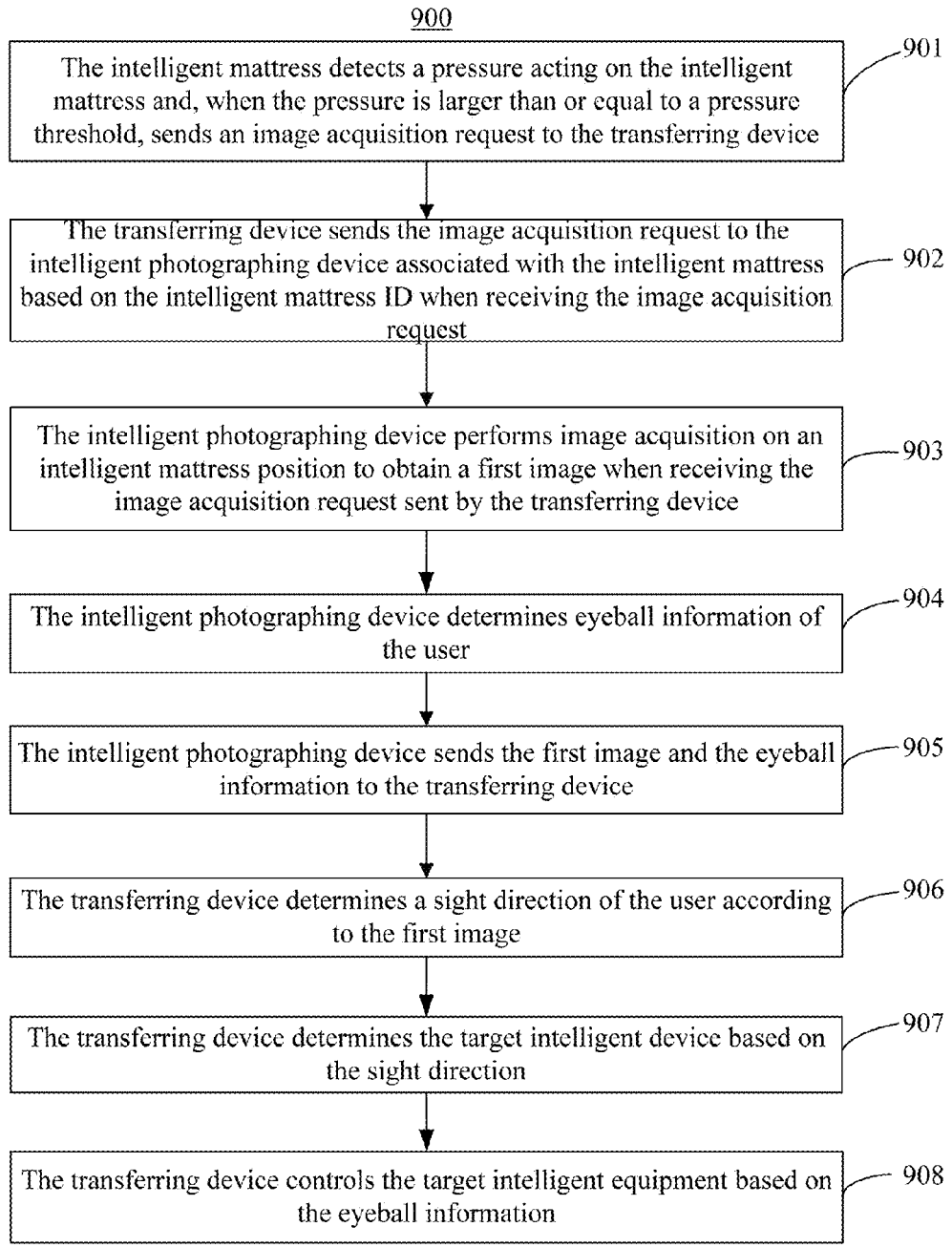
FIG. 9 is a flow chart of a method for controlling intelligent equipment according to another exemplary embodiment.

FIG. 9 is a flow chart showing a method 900 for controlling intelligent equipment according to another exemplary embodiment. The method 900 can be implemented, for example, in the system 100. As shown in FIG. 9, processes 901, 902, and 903 are similar to the processes 601, 602, and 603 of the method 600, and thus detailed description thereof is omitted here.

At 904, the intelligent photographing device determines eyeball information of the user using the intelligent mattress. The operation to determine the eyeball information of the user is similar to that described with respect to process 604 of the method 600, and thus is not repeated here.

At 905, the intelligent photographing device sends the first image and the eyeball information to the transferring device, to enable the transferring device to control the target intelligent device based on the first image and the eyeball information.

At 906, the transferring device determines a sight direction of the user according to the first image.

In some embodiments, to determine the sight direction of the user according to the first image, the transferring device performs face recognition on the first image to obtain an eye position, and performs sight recognition on the eye of the user to obtain the sight direction of the user based on the eye position.

In some embodiments, to perform sight recognition on the eye of the user to obtain the sight direction of the user based on the eye position, the transferring device determines an eye pupil offset angle of an eye pupil of the user relative to a normal sight direction based on the eye position and determines the sight direction of the user based on the eye pupil offset angle.

Detailed processes of image recognition and sight recognition are similar to those described above with respect to process 604 of the method 600, and thus are not repeated here.

At 907, the transferring device determines the target intelligent device based on the sight direction.

In some embodiments, to determine the target intelligent device based on the sight direction, the transferring device determines a first angle between the sight direction and a horizontal direction and a second angle between the sight direction and a specified direction, acquires a corresponding intelligent device ID from a stored corresponding relationship among first angles, second angles, and intelligent device IDs based on the first angle and the second angle, and determines an intelligent device corresponding to the acquired intelligent device ID as the target intelligent device.

In some embodiments, the transferring device sends the sight direction to the intelligent photographing device to enable the intelligent photographing device to perform image acquisition on a sight position to obtain a second image and return the second image. The transferring device then determines the target intelligent device based on the second image.

In some embodiments, when receiving the sight direction, and the intelligent photographing device performs image acquisition on the sight position to obtain the second image and sends the second image to the transferring device.

To determine the target intelligent device based on the second image, the transferring device can select a target image matching the second image from a stored image library and determine an intelligent device in the target image as the target intelligent device. Alternatively, the transferring device recognizes a device mark of the intelligent device in the second image, acquires a corresponding intelligent device ID from a stored corresponding relationship between device marks and intelligent device IDs based on the device mark, and determines an intelligent device corresponding to the acquired intelligent device ID as the target intelligent device. A detailed process of determining the target intelligent device is similar to that described above with respect to process 606 of the method 600, and thus is not repeated here.

At 908, the transferring device controls the target intelligent device based on the eyeball information. A detailed process of controlling the target intelligent device is similar to that described above with respect to process 607 of the method 600, and thus is not repeated here.

Figure 10:
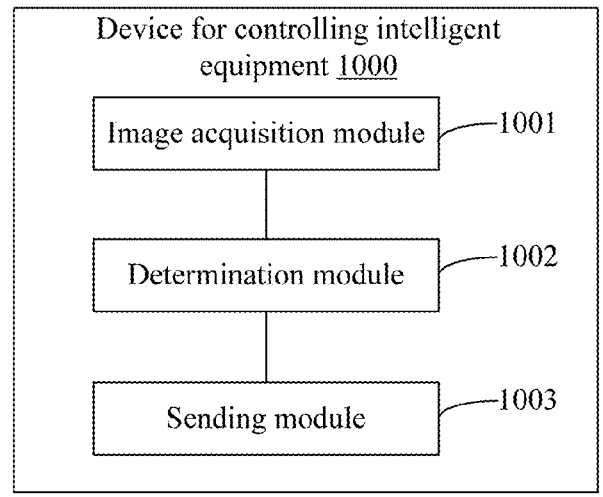
FIG. 10 is a block diagram of a device for controlling intelligent equipment according to an exemplary embodiment.

FIG. 10 is a block diagram of a device 1000 for controlling intelligent equipment according to an exemplary embodiment. The device 1000 can be implemented, for example, in the intelligent photographing device shown in FIG. 1. As shown in FIG. 10, the device 1000 includes an image acquisition module 1001, a determination module 1002, and a sending module 1003. The image acquisition module 1001 is configured to, when receiving an image acquisition request sent from the intelligent mattress through the transferring device, perform image acquisition on an intelligent mattress position to obtain a first image. The image acquisition request is triggered when a user uses the intelligent mattress. The determination module 1002 is configured to determine eyeball information of the user and device identification information based on the first image. The device identification information is configured to determine the target intelligent device to be controlled. The sending module 1003 is configured to send the device identification information and the eyeball information to the transferring device to enable the transferring device to control the target intelligent device based on the device identification information and the eyeball information.

Figure 11:
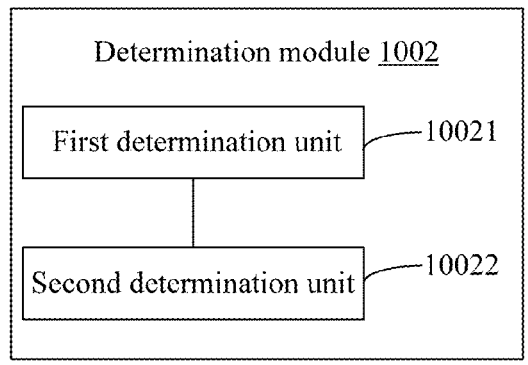
FIG. 11 is a block diagram of a determination module in the device shown in FIG. 10 according to an exemplary embodiment.

In some embodiments, the determination module 1002, as shown in FIG. 11, includes a first determination unit 10021 configured to determine a sight direction of the user according to the first image and a second determination unit 10022 configured to determine the device identification information based on the sight direction.

Figure 12:
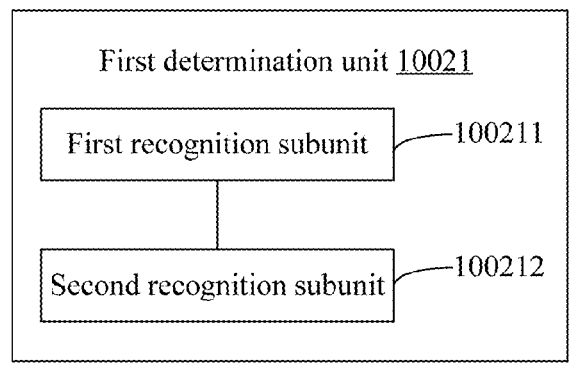
FIG. 12 is a block diagram of a first determination unit in the determination module shown in FIG. 11 according to an exemplary embodiment.

In some embodiments, the first determination unit 10021, as shown in FIG. 12, includes a first recognition subunit 100211 configured to perform face recognition on the first image to obtain an eye position and a second recognition subunit 100212 configured to perform sight recognition on the eye of the user to obtain the sight direction of the user based on the eye position.

In some embodiments, the second recognition subunit 100212 is configured to determine an eye pupil offset angle of an eye pupil of the user relative to a normal sight direction based on the eye position and determine the sight direction of the user based on the eye pupil offset angle.

Figure 13:
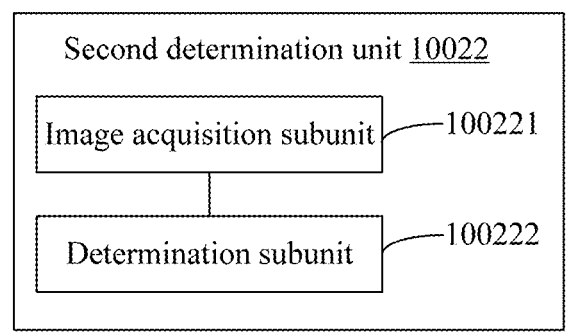
FIG. 13 is a block diagram of a second determination unit in the determination module shown in FIG. 11 according to an exemplary embodiment.

In some embodiments, the second determination unit 10022, as shown in FIG. 13, includes an image acquisition subunit 100221 or a determination subunit 100222. The image acquisition subunit 100221 is configured to perform image acquisition on a sight position to obtain a second image and determine the second image as the device identification information. The determination subunit 100222 is configured to determine a first angle between the sight direction and a horizontal direction, determine a second angle between the sight direction and a specified direction, and determine the first angle and the second angle as the device identification information.

Figure 14:
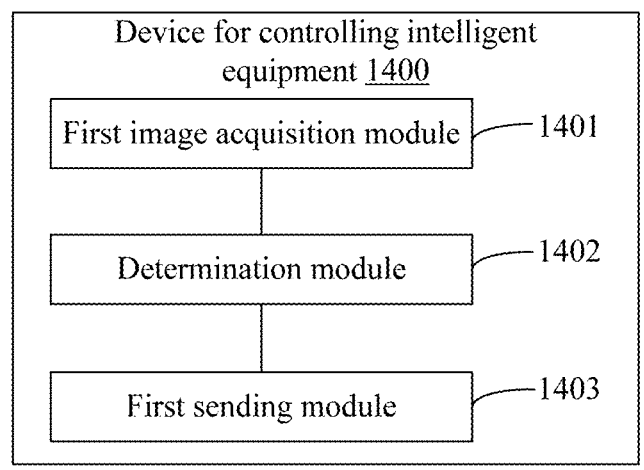
FIG. 14 is a block diagram of a device for controlling intelligent equipment according to another exemplary embodiment.

FIG. 14 is block diagram of a device 1400 for controlling intelligent equipment according to another exemplary embodiment. The device 1400 can be implemented, for example, in the intelligent photographing device shown in FIG. 1. As shown in FIG. 14, the device 1400 includes a first image acquisition module 1401, a determination module 1402, and a first sending module 1403. The first image acquisition module 1401 is configured to, when receiving an image acquisition request sent from the intelligent mattress through the transferring device, perform image acquisition on an intelligent mattress position to obtain a first image. The image acquisition request is triggered when the user uses the intelligent mattress. The determination module 1402 is configured to determine eyeball information of the user. The first sending module 1403 is configured to send the first image and the eyeball information to the transferring device to enable the transferring device to control the target intelligent device based on the first image and the eyeball information.

Figure 15:
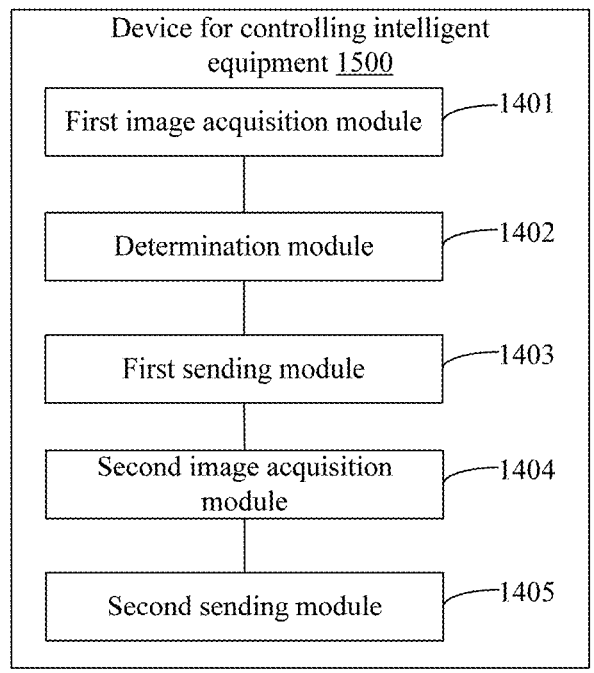
FIG. 15 is a block diagram of a device for controlling intelligent equipment according to another exemplary embodiment.

FIG. 15 is a block diagram of a device 1500 for controlling intelligent equipment according to another exemplary embodiment. The device 1500 is similar to the device 1400, except that the device 1500 further includes a second image acquisition module 1404 and a second sending module 1405. The second image acquisition module 1404 is configured to, when receiving a sight direction sent by the transferring device, perform image acquisition on a sight position to obtain a second image. The sight direction is obtained by the transferring device by analyzing the first image. The second sending module 1405 is configured to send the second image to the transferring device.

Figure 16:
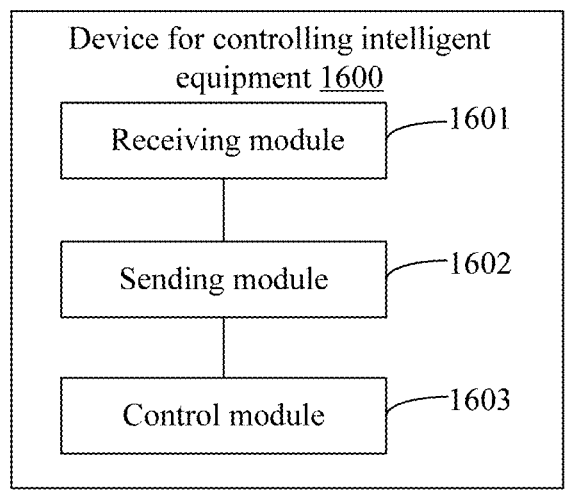
FIG. 16 is a block diagram of a device for controlling intelligent equipment according to another exemplary embodiment.

FIG. 16 is a block diagram of a device 1600 for controlling intelligent equipment according to another exemplary embodiment. The device 1600 can be implemented, for example, in the transferring device shown in FIG. 1. As shown in FIG. 16, the device 1600 includes a receiving module 1601, a sending module 1602, and a control module 1603. The receiving module 1601 is configured to receive an image acquisition request from the intelligent mattress. The image acquisition request contains an ID of the intelligent mattress and is triggered when the user uses the intelligent mattress. The sending module 1602 is configured to send the image acquisition request to the intelligent photographing device associated with the intelligent mattress based on the intelligent mattress ID. The intelligent photographing device can perform image acquisition on an intelligent mattress position to obtain a first image and return eyeball information of the user and device identification information based on the first image. The device identification information is configured to determine the target intelligent device to be controlled. The control module 1603 is configured to control the target intelligent device based on the device identification information and the eyeball information.

Figure 17:
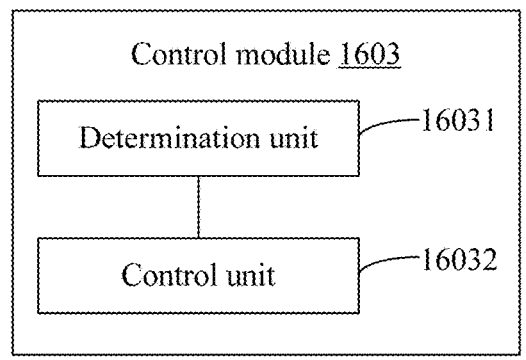
FIG. 17 is a block diagram of a control module in the device shown in FIG. 16 according to an exemplary embodiment.

In some embodiments, the control module 1603, as shown in FIG. 17, includes a determination unit 16031 configured to determine the target intelligent device based on the device identification information and a control unit 16032 configured to control the target intelligent device based on the eyeball information.

Figure 18:
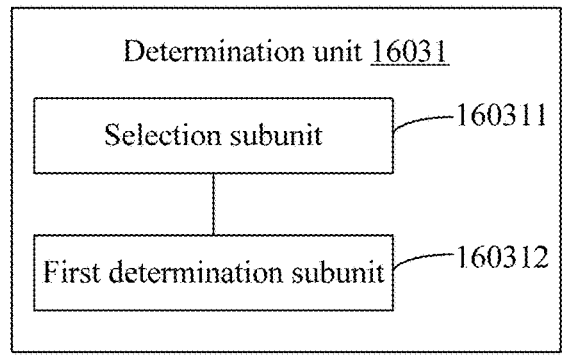
FIG. 18 is a block diagram of a determination unit in the control module shown in FIG. 17 according to an exemplary embodiment.

In some embodiments, the determination unit 16031, as shown in FIG. 18, includes a selection subunit 160311 and a first determination subunit 160312. The selection subunit 160311 is configured to, when the device identification information includes a second image, select a target image matching the second image from a stored image library. The second image is obtained by the intelligent photographing device by performing image acquisition on a sight position. The first determination subunit 160312 is configured to determine an intelligent device in the target image as the target intelligent device.

Figure 19:
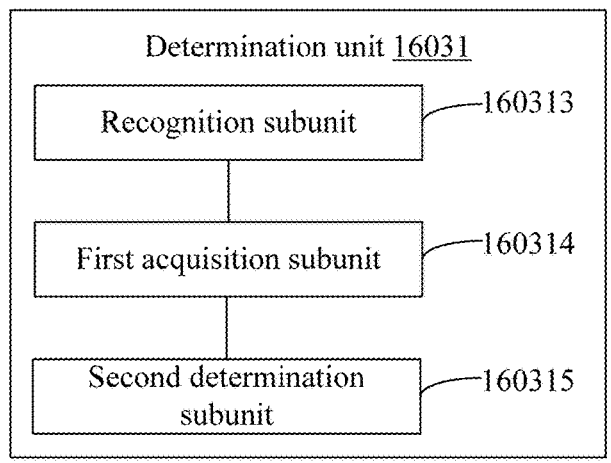
FIG. 19 is a block diagram of a determination unit in the control module shown in FIG. 17 according to another exemplary embodiment.

In some embodiments, the determination unit 16031, as shown in FIG. 19, includes a recognition subunit 160313, a first acquisition subunit 160314, and a second determination subunit 160315. The recognition subunit 160313 is configured to, when the device identification information includes the second image, recognize from the second image a device mark of the intelligent device in the second image. The first acquisition subunit 160314 is configured to acquire a corresponding intelligent device ID from a stored corresponding relationship between device marks and intelligent device IDs based on the device mark. The second determination subunit 160315 is configured to determine an intelligent device corresponding to the acquired intelligent device ID as the target intelligent device.

Figure 20:
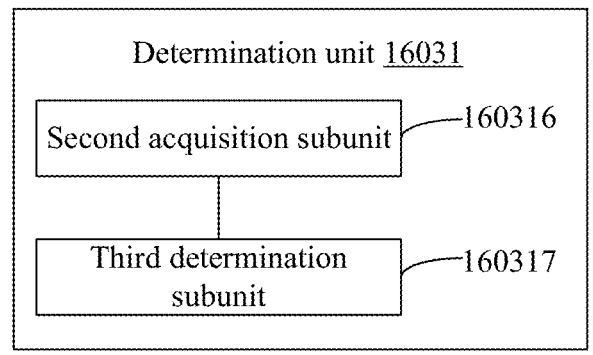
FIG. 20 is a block diagram of a determination unit in the control module shown in FIG. 17 according to another exemplary embodiment.

In some embodiments, the determination unit 16031, as shown in FIG. 20, includes a second acquisition subunit 160316 and a third determination subunit 160317. The second acquisition subunit 160316 is configured to, when the device identification information is a first angle and a second angle, acquire a corresponding intelligent device ID from a stored corresponding relationship among first angles, second angles, and intelligent device IDs based on the first angle and the second angle. The first angle is an angle between the sight direction of the user and a horizontal direction and the second angle is an angle between the sight direction and a specified direction. The third determination subunit 160317 is configured to determine an intelligent device corresponding to the acquired intelligent device ID as the target intelligent device.

Figure 21:
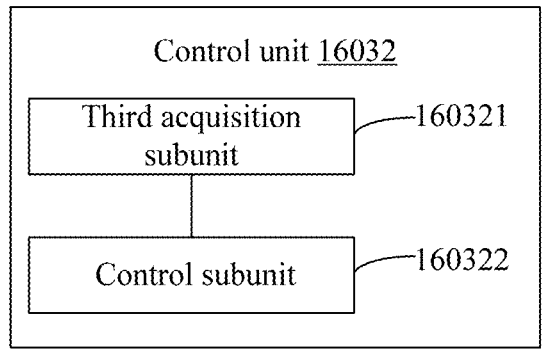
FIG. 21 is a block diagram of a control unit in the control module shown in FIG. 17 according to an exemplary embodiment.

In some embodiments, the control unit 16032, as shown in FIG. 21, includes a third acquisition subunit 160321 and a control subunit 160322. The third acquisition subunit 160321 is configured to acquire a corresponding control operation from a stored corresponding relationship between eyeball information and control operations based on the eyeball information. The control subunit 160322 is configured to control the target intelligent device based on the acquired control operation.

Figure 22:
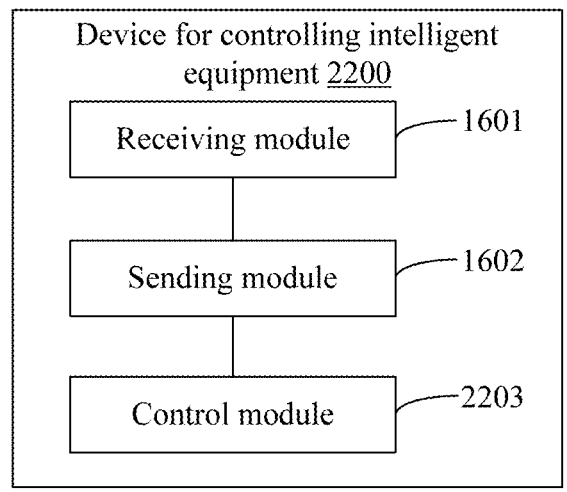
FIG. 22 is a block diagram of a device for controlling intelligent equipment according to another exemplary embodiment.

FIG. 22 is a block diagram of a device 2200 for controlling intelligent equipment according to another exemplary embodiment. The device 2200 can be implemented, for example, in the transferring device shown in FIG. 1. As shown in FIG. 22, the device 2200 includes the receiving module 1601, the sending module 1602, and a control module 2203. In this example, when the intelligent photographing device receives the image acquisition request sent by the sending module 1602, the intelligent photographing device can perform image acquisition on an intelligent mattress position to obtain a first image and return the first image and eyeball information of the user. The control module 2203 is configured to control the target intelligent device based on the first image and the eyeball information.

Figure 23:
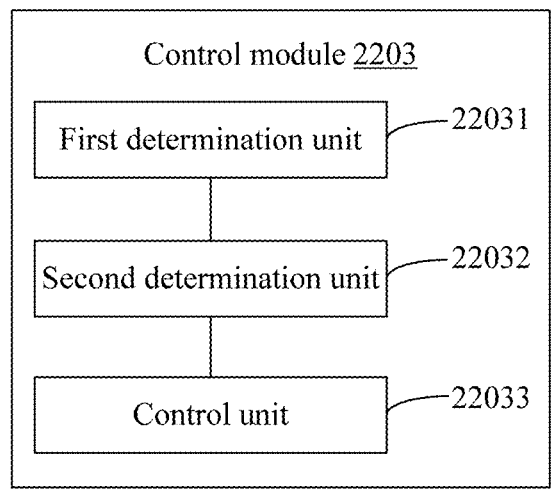
FIG. 23 is a block diagram of a control module in the device shown in FIG. 22 according to an exemplary embodiment.

In some embodiments, the control module 2203, as shown in FIG. 23, includes a first determination unit 22031 configured to determine a sight direction of the user according to the first image, a second determination unit 22032 configured to determine the target intelligent device based on the sight direction, and a control unit 22033 configured to control the target intelligent device based on the eyeball information.

Figure 24:
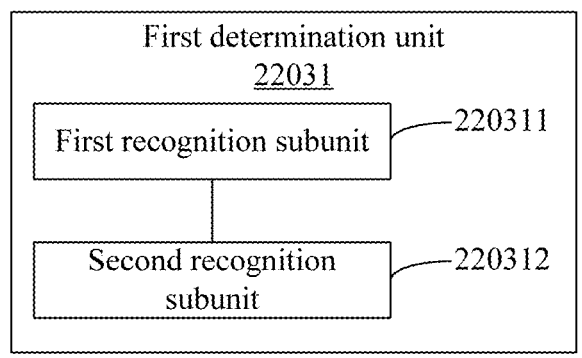
FIG. 24 is a block diagram of a first determination unit in the control module shown in FIG. 23 according to an exemplary embodiment.

In some embodiments, the first determination unit 22031, as shown in FIG. 24, includes a first recognition subunit 220311 configured to perform face recognition on the first image to obtain an eye position and a second recognition subunit 220312 configured to perform sight recognition on the eye of the user to obtain the sight direction of the user based on the eye position.

In some embodiments, the second recognition subunit 220312 is configured to determine an eye pupil offset angle of an eye pupil of the user relative to a normal sight direction based on the eye position and determine the sight direction of the user based on the eye pupil offset angle.

Figure 25:
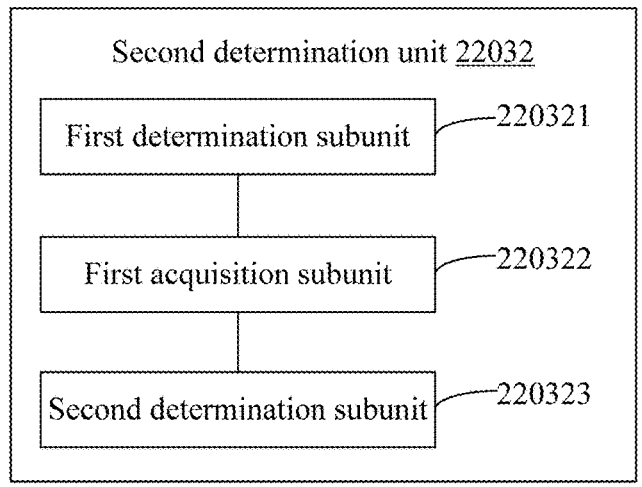
FIG. 25 is a block diagram of a second determination unit in the control module shown in FIG. 23 according to an exemplary embodiment.

In some embodiments, the second determination unit 22032, as shown in FIG. 25, includes a first determination subunit 220321, a first acquisition subunit 220322, and a second acquisition subunit 220323. The first determination subunit 220321 is configured to determine a first angle between the sight direction and a horizontal direction and a second angle between the sight direction and a specified direction. The first acquisition subunit 220322 is configured to acquire a corresponding intelligent device ID from a stored corresponding relationship among first angles, second angles, and intelligent device IDs based on the first angle and the second angle. The second determination subunit 220323 is configured to determine an intelligent device corresponding to the acquired intelligent device ID as the target intelligent device.

Figure 26:
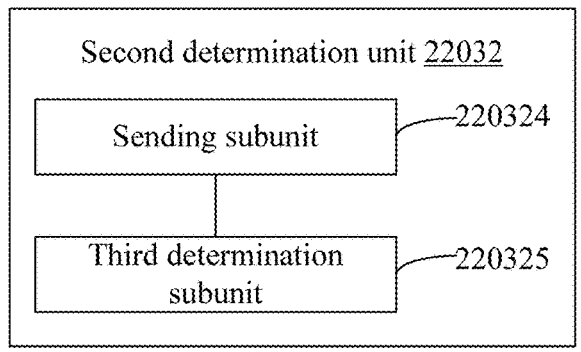
FIG. 26 is a block diagram of a second determination unit in the control module shown in FIG. 23 according to another exemplary embodiment.

In some embodiments, the second determination unit 22032, as shown in FIG. 26, includes a sending subunit 220324 and a third determination subunit 220325. The sending subunit 220324 is configured to send the sight direction to the intelligent photographing device, to enable the intelligent photographing device to perform image acquisition on a sight position to obtain a second image and return the second image. The third determination subunit 220325 is configured to, when receiving the second image returned by the intelligent photographing device, determine the target intelligent device based on the second image.

In some embodiments, the third determination subunit 220325 is configured to select a target image matching the second image from a stored image library and determine an intelligent device in the target image as the target intelligent device.

In some embodiments, the third determination subunit 220325 is configured to recognize, from the second image, a device mark of the intelligent device in the second image, acquire a corresponding intelligent device ID from a stored corresponding relationship between device marks and intelligent device IDs based on the device mark, and determine an intelligent device corresponding to the acquired intelligent device ID as the target intelligent device.

Figure 27:
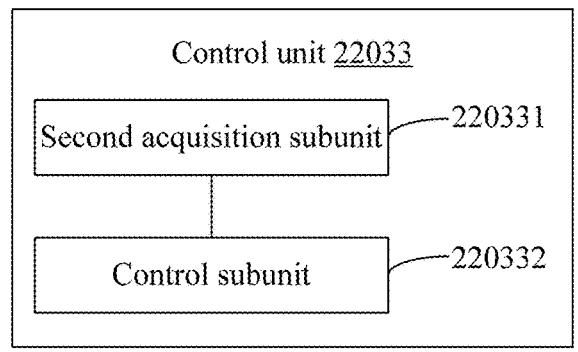
FIG. 27 is a block diagram of a control unit in the control module shown in FIG. 23 according to an exemplary embodiment.

In some embodiments, the control unit 22033, as shown in FIG. 27, includes a second acquisition subunit 220331 configured to acquire a corresponding control operation from a stored corresponding relationship between eyeball information and control operations based on the eyeball information and a control subunit 220332 configured to control the target intelligent device based on the acquired control operation.

Details of the operations of individual modules are similar to the exemplary methods described above, and thus are not repeated here.

Figure 28:
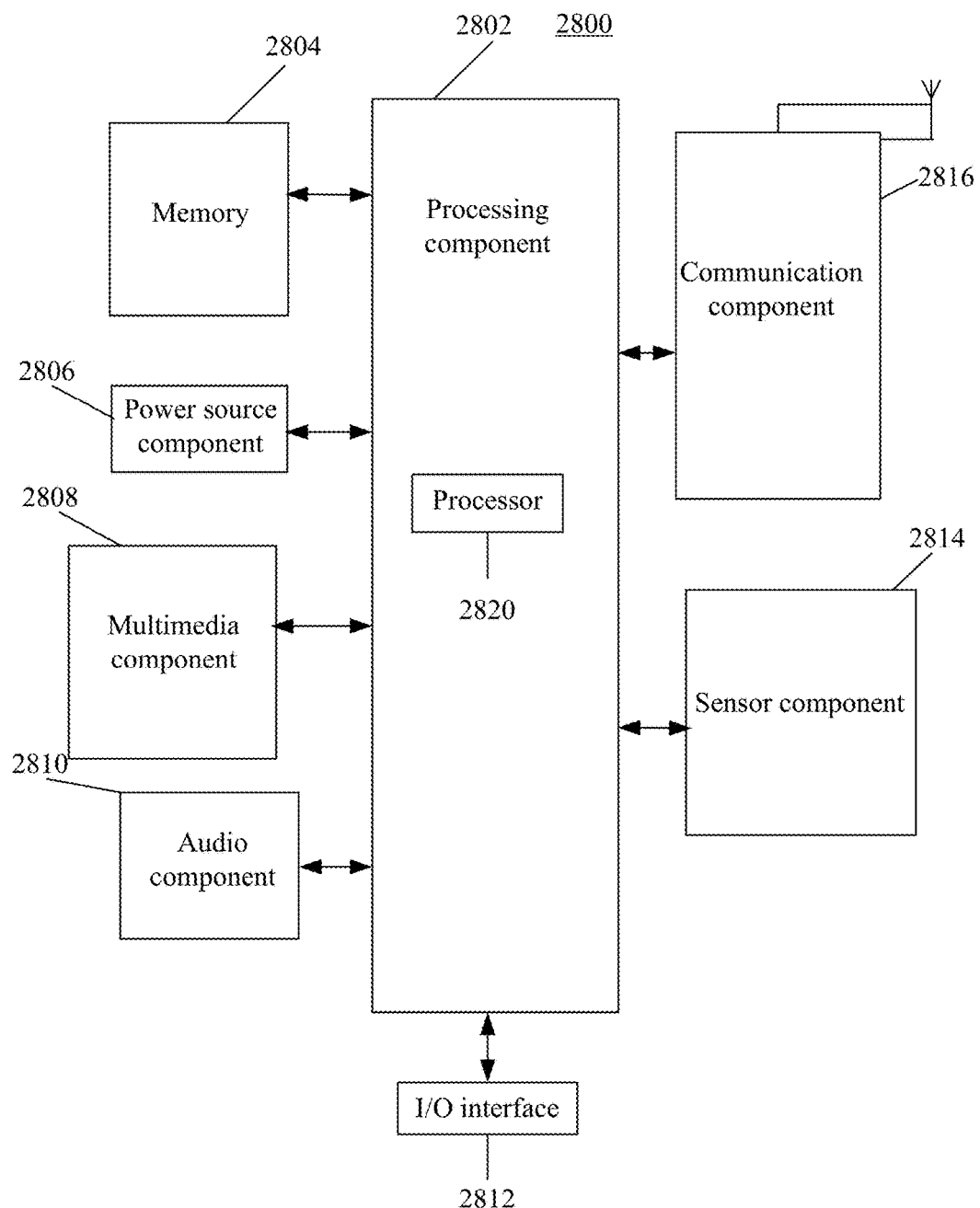
FIG. 28 is a block diagram of a device for controlling intelligent equipment according to another exemplary embodiment.

FIG. 28 is a block diagram of a device 2800 for controlling intelligent equipment according to another exemplary embodiment. For example, the device 2800 may be a mobile phone, a computer, a digital broadcast terminal, a message transceiver, a games console, a tablet device, a medical device, fitness equipment, a personal digital assistant, an intelligent camera, or the like.

Referring to FIG. 28, the device 2800 includes at least one of the following components: a processing component 2802, a memory 2804, a power source component 2806, a multimedia component 2808, an audio component 2810, an Input/Output (I/O) interface 2812, a sensor component 2814, and a communication component 2816.

The processing component 2802 typically controls overall operations of the device 2800, such as the operations associated with display, data communications, camera operations, and recording operations. The processing component 2802 may include one or more processors 2820 to execute instructions to perform all or part of the steps in the abovementioned methods. Moreover, the processing component 2802 may include one or more modules which facilitate interaction between the processing component 2802 and other components. For instance, the processing component 2802 may include a multimedia module to facilitate interaction between the multimedia component 2808 and the processing component 2802.

The memory 2804 is configured to store various types of data to support operations at the device 2800. Examples of such data include messages, pictures, video, instructions for any applications or methods operated on the device 2800, etc. The memory 2804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power source component 2806 provides power for various components of the device 2800. The power source component 2806 may include a power management system, one or more power supplies, and other components associated with generation, management and distribution of power for the device 2800.

The multimedia component 2808 includes a screen providing an output interface between the device 2800 and a user. In some embodiments, the screen may include a Liquid Crystal Display (LCD) and a touch panel. When the screen includes a touch panel, the screen may be implemented as a touch screen to receive an input signal from the user. The touch panel includes one or more touch sensors to sense a touch, a slide and a gesture on the touch panel. The touch sensors may not only sense a boundary of a touch or slide action, but also sense a duration and pressure associated with the touch or slide action. In some embodiments, the multimedia component 2808 includes a front camera and/or a rear camera. The front camera and/or the rear camera may receive external multimedia data when the device 2800 is in an operation mode, such as a photographing mode or a video mode. Each of the front camera and the rear camera may be a fixed optical lens system or have focusing and optical zooming capabilities.

The audio component 2810 is configured to output and/or input an audio signal. For example, the audio component 2810 includes a microphone, and the microphone is configured to receive an external audio signal when the device 2800 is in the operation mode, such as a call mode, a recording mode and a voice recognition mode. The received audio signal may be further stored in the memory 2804 or sent through the communication component 2816. In some embodiments, the audio component 2810 further includes a speaker configured to output the audio signal.

The I/O interface 2812 provides an interface between the processing component 2802 and a peripheral interface module. The peripheral interface module may be a keyboard, a click wheel, a button, or the like. The button may include, but not limited to: a home button, a volume button, a starting button, or a locking button.

The sensor component 2814 includes one or more sensors configured to provide status assessment in various aspects for the device 2800. For instance, the sensor component 2814 may detect an on/off status of the device 2800 and relative positioning of components, such as a display and a keyboard of the device 2800, and the sensor component 2814 may further detect a change in a position of the device 2800 or a component of the device 2800, presence or absence of contact between the user and the device 2800, orientation or acceleration/deceleration of the device 2800 and a change in temperature of the device 2800. The sensor component 2814 may include a proximity sensor configured to detect presence of an object nearby without any physical contact. The sensor component 2814 may also include an optical sensor, such as a Complementary Metal Oxide Semiconductor (CMOS) or Charge Coupled Device (CCD) image sensor, used in an imaging application. In some embodiments, the sensor component 2814 may also include an acceleration sensor, a gyroscope sensor, a magnetic sensor, a pressure sensor or a temperature sensor.

The communication component 2816 is configured to facilitate wired or wireless communication between the device 2800 and other devices. The device 2800 may access a communication-standard-based wireless network, such as a Wireless Fidelity (WiFi) network. In an exemplary embodiment, the communication component 2816 receives a broadcast signal or broadcast associated information from an external broadcast management system through a broadcast channel. In an exemplary embodiment, the communication component 2816 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a BT technology and another technology.

In an exemplary embodiment, the device 2800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned methods.

According to the present disclosure, there is also provided a non-transitory computer-readable storage medium storing instructions, such as the memory 2804 storing instructions, that can be executed by the processor 2820 of the device 2800 to implement a method consistent with the present disclosure, such as one of the above-described exemplary methods. For example, the non-transitory computer-readable storage medium may be a Read Only Memory (ROM), a Radom Access Memory (RAM), a Compact Disc Read-Only Memory (CD-ROM), a magnetic tape, a floppy disc, an optical data storage device, or the like.

Figure 29:
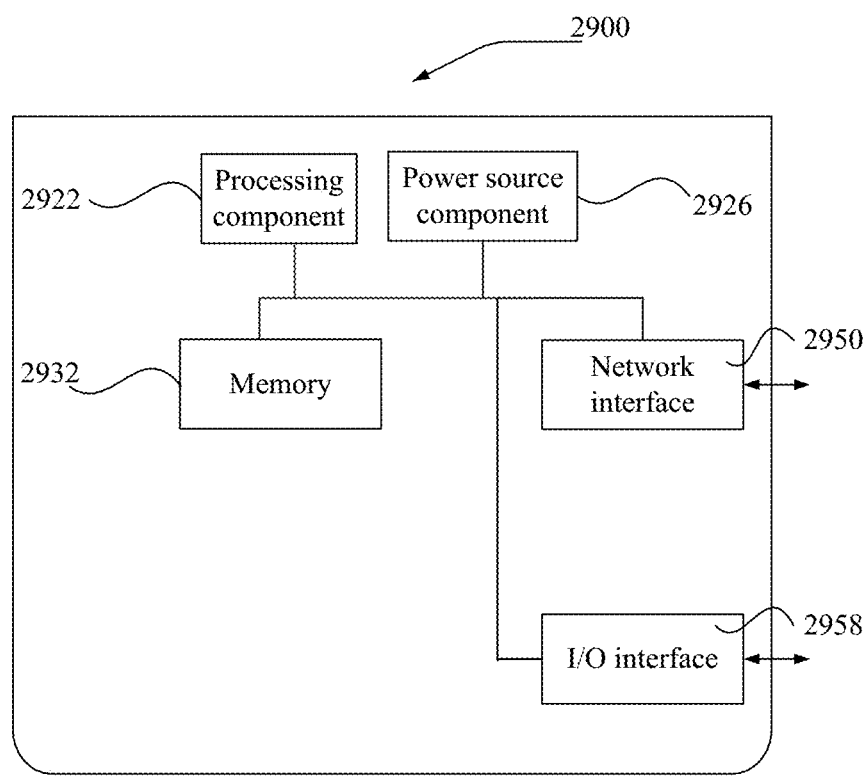
FIG. 29 is a block diagram of a device for controlling intelligent equipment according to another exemplary embodiment.

FIG. 29 is a block diagram of a device 2900 for controlling intelligent equipment according to another exemplary embodiment. For example, the device 2900 may be provided as the transferring device shown in FIG. 1. Referring to FIG. 29, the device 2900 includes a processing component 2922, which further includes one or more processors, and a memory resource represented by a memory 2932, configured to store instructions such as application programs executable by the processing component 2922. The application programs stored in the memory 2932 may include one or more than one module which each corresponds to a set of instructions.

The device 2900 may further include a power source component 2926 configured to execute power mangement of the device 2900, a wired or wireless network interface 2950 configured to connect the device 2900 to a network, and an I/O interface 2958. The device 2900 may be operated based on an operating system stored in the memory 2932, such as Windows Server™, Mac OS X™, Unix™, Linux™, or FreeBSD™.

In addition, the processing component 2922 is configured to execute the instructions to perform a method consistent with the present disclosure, such as one of the above-described exemplary methods.

According to the present disclosure, the user can control the target intelligent device without using a remote controller. Therefore, it is more convenient and easier to control the intelligent equipment and user experience in controlling the target intelligent device can be improved.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction described above and illustrated in the accompanying drawings, and that various modifications and changes may be made without departing from the scope thereof. The scope of the present disclosure is only limited by the appended claims.

INDUSTRY APPLICABILITY

According to the embodiments of the present disclosure, interaction among an intelligent mattress, intelligent photographing device and target intelligent device is implemented through a transferring device, and then the intelligent mattress acquires an image, and acquires device identification information and eyeball information from the acquired image to implement control over the target intelligent device based on the device identification information and the eyeball information, so that a user may control the target intelligent device without a remote controller, and user experiences in control over the target intelligent device are improved.

What is claimed is:

1. A method for controlling intelligent equipment, comprising:
   receiving an image acquisition request sent from an intelligent mattress, the image acquisition request containing an identifier (ID) of the intelligent mattress and being triggered when a user uses the intelligent mattress;
   sending the image acquisition request to an intelligent photographing device associated with the intelligent mattress based on the ID of the intelligent mattress;
   receiving eyeball information of the user and device identification information;
   determining a target intelligent device based on the device identification information; and
   controlling the target intelligent device based on the eyeball information.

2. The method according to claim 1, wherein:
   the device identification information includes a sight position image obtained by the intelligent photographing device by performing image acquisition on a sight position to which a sight direction of the user points, and
   determining the target intelligent device includes:
      selecting, from a stored image library, a target image matching the sight position image; and
      determining an intelligent device in the target image as the target intelligent device.

3. The method according to claim 1, wherein controlling the target intelligent device based on the eyeball information includes:
   acquiring a corresponding control operation from a stored corresponding relationship between eyeball information and control operations based on the eyeball information; and
   controlling the target intelligent device based on the acquired corresponding control operation.

4. A method for controlling intelligent equipment, comprising:
   receiving an image acquisition request sent from an intelligent mattress, the image acquisition request containing an identifier (ID) of the intelligent mattress and being triggered when a user uses the intelligent mattress;
   sending the image acquisition request to an intelligent photographing device associated with the intelligent mattress based on the ID of the intelligent mattress;
   receiving a mattress position image and eyeball information of the user, the mattress position image being obtained by the intelligent photographing device by performing image acquisition on a position where the intelligent mattress is located;
   determining a target intelligent device based on the mattress position image; and
   controlling the target intelligent device based on the eyeball information.

5. The method according to claim 4, wherein determining the target intelligent device includes:
   determining a sight direction of the user according to the mattress position image; and
   determining the target intelligent device based on the sight direction.

6. The method according to claim 5, wherein determining the sight direction includes:
   performing face recognition on the mattress position image to obtain an eye position of the user; and
   performing sight recognition on an eye of the user to obtain the sight direction of the user based on the eye position.

7. The method according to claim 6, wherein performing the sight recognition on the eye of the user includes:
   determining an eye pupil offset angle of an eye pupil of the user relative to a normal sight direction based on the eye position; and
   determining the sight direction of the user based on the eye pupil offset angle.

8. The method according to claim 5, wherein determining the target intelligent device based on the sight direction includes:
   determining a sight-horizontal angle between the sight direction and a horizontal direction and a sight-specified angle between the sight direction and a specified direction;
   acquiring a corresponding intelligent device ID from a stored corresponding relationship among sight-horizontal angles, sight-specified angles, and intelligent device IDs based on the sight-horizontal angle and the sight-specified angle; and
   determining an intelligent device corresponding to the acquired corresponding intelligent device ID as the target intelligent device.

9. The method according to claim 5, wherein determining the target intelligent device based on the sight direction includes:
   sending the sight direction to the intelligent photographing device;
   receiving a sight position image obtained by the intelligent photographing device by performing image acquisition on a sight position to which the sight direction points; and
   determining the target intelligent device based on the sight position image.

10. The method according to claim 9, wherein determining the target intelligent device based on the sight position image includes:
    selecting a target image matching the sight position image from a stored image library; and
    determining an intelligent device in the target image as the target intelligent device.

11. The method according to claim 9, wherein determining the target intelligent device based on the sight position image includes:
    recognizing, from the sight position image, a device mark of an intelligent device in the sight position image;

acquiring a corresponding intelligent device ID from a stored corresponding relationship between device marks and intelligent device IDs based on the recognized device mark; and determining an intelligent device corresponding to the acquired corresponding intelligent device ID as the target intelligent device.

12. The method according to claim 4, wherein controlling the target intelligent device includes:

acquiring a corresponding control operation from a stored corresponding relationship between eyeball information and control operations based on the eyeball information; and controlling the target intelligent device based on the acquired corresponding control operation.

13. A device for controlling intelligent equipment, comprising:

a processor; and a memory storing instructions that, when executed by the processor, cause the processor to:

receive an image acquisition request sent from an intelligent mattress, the image acquisition request containing an identifier (ID) of the intelligent mattress and being triggered when a user uses the intelligent mattress;

send the image acquisition request to an intelligent photographing device associated with the intelligent mattress based on the ID of the intelligent mattress;

receive eyeball information of the user and device identification information;

determine a target intelligent device based on the device identification information; and control the target intelligent device based on the eyeball information.

14. The device according to claim 13, wherein:

the device identification information includes a sight position image obtained by the intelligent photographing device by performing image acquisition on a sight position to which a sight direction of the user points, and the instructions further cause the processor to:

select, from a stored image library, a target image matching the sight position image; and determine an intelligent device in the target image as the target intelligent device.

15. A device for controlling intelligent equipment, comprising:

a processor; and a memory storing instructions that, when executed by the processor, cause the processor to:

receive an image acquisition request sent from an intelligent mattress, the image acquisition request containing an identifier (ID) of the intelligent mattress and being triggered when a user uses the intelligent mattress;

send the image acquisition request to an intelligent photographing device associated with the intelligent mattress based on the ID of the intelligent mattress;

receive a mattress position image and eyeball information of the user, the mattress position image being obtained by the intelligent photographing device by performing image acquisition on a position where the intelligent mattress is located;

determine a target intelligent device based on the mattress position image; and control the target intelligent device based on the eyeball information.

16. The device according to claim 15, wherein the instructions further cause the processor to:

determine a sight direction of the user according to the mattress position image;

determine the target intelligent device based on the sight direction; and control the target intelligent device based on the eyeball information.

* * * * *